(12) United States Patent
Song et al.

(10) Patent No.: US 11,819,794 B2
(45) Date of Patent: Nov. 21, 2023

(54) GAS HYDRATE-BASED PARTICULATE/WASTE GAS SIMULTANEOUS REMOVAL SYSTEM AND METHOD

(71) Applicant: DALIAN UNIVERSITY OF TECHNOLOGY, Liaoning (CN)

(72) Inventors: Yongchen Song, Liaoning (CN); Man Li, Liaoning (CN); Jiafei Zhao, Liaoning (CN); Lei Yang, Liaoning (CN); Zhongwang Sun, Liaoning (CN); Lunxiang Zhang, Liaoning (CN); Weiguo Liu, Liaoning (CN); Yanghui Li, Liaoning (CN); Yu Liu, Liaoning (CN); Mingjun Yang, Liaoning (CN); Yi Zhang, Liaoning (CN); Dayong Wang, Liaoning (CN); Zheng Ling, Liaoning (CN); Lanlan Jiang, Liaoning (CN); Cong Chen, Liaoning (CN); Yuechao Zhao, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 553 days.

(21) Appl. No.: 17/056,296

(22) PCT Filed: Feb. 28, 2020

(86) PCT No.: PCT/CN2020/077106
§ 371 (c)(1),
(2) Date: Nov. 17, 2020

(87) PCT Pub. No.: WO2021/120395
PCT Pub. Date: Jun. 24, 2021

(65) Prior Publication Data
US 2021/0260517 A1     Aug. 26, 2021

(30) Foreign Application Priority Data

Dec. 20, 2019   (CN) .................... 201911327867.7

(51) Int. Cl.
*B01D 47/02*     (2006.01)
*B01D 53/00*     (2006.01)
(Continued)

(52) U.S. Cl.
CPC ........... *B01D 47/02* (2013.01); *B01D 53/005* (2013.01); *B01D 53/62* (2013.01); *B01D 53/75* (2013.01);
(Continued)

(58) Field of Classification Search
CPC ...... B01D 47/02; B01D 53/005; B01D 53/62; B01D 53/75; B01D 53/78; B01D 53/96;
(Continued)

(56) References Cited

U.S. PATENT DOCUMENTS 6,451,269 B1    9/2002    Conant

FOREIGN PATENT DOCUMENTS

CN    101511449 A    8/2009
CN    101703885 A    5/2010
(Continued)

OTHER PUBLICATIONS

Google translation of CN105080323 (Year: 2015).*

*Primary Examiner* — Stephen Hobson
(74) *Attorney, Agent, or Firm* — Muncy, Geissler, Olds & Lowe, P.C.

(57) ABSTRACT

The present invention discloses a gas hydrate-based particulate/waste gas simultaneous removal system and method. R134a can be used to synthesize particulates/coking waste gases into gas hydrate, which can realize the simultaneous removal of particulates/coking waste gases with no pollution (Continued)

and low energy consumption. The system comprises a waste heat recovery device, a gas hydrate primary dust removal tower, a solid-liquid separation primary tower, a gas hydrate secondary dust removal tower, a solid-liquid separation secondary tower, a gas hydrate decomposition pool, a gas-solid separation tower and a low temperature fractionation device. The present invention can achieve the removal of harmful substances such as heavy metals and coking waste gases while removing particulates. Compared with the current particulate control and waste gas treatment device, the gas hydrate method-based device is greatly simplified and can effectively remove multiple pollutants and realize energy saving and environmental protection.

4 Claims, 1 Drawing Sheet

(51) Int. Cl.
B01D 53/62 (2006.01)
B01D 53/75 (2006.01)
B01D 53/78 (2006.01)
B01D 53/96 (2006.01)

(52) U.S. Cl.
CPC .............. *B01D 53/78* (2013.01); *B01D 53/96* (2013.01); *B01D 2258/0283* (2013.01)

(58) Field of Classification Search
CPC ........ B01D 2258/0283; B01D 53/1493; B01D 2257/108; B01D 2257/304; B01D 2257/7025; B01D 2258/025; Y02C 20/20
See application file for complete search history.

(56) References Cited

FOREIGN PATENT DOCUMENTS

| | | | |
|---|---|---|---|
| CN | 202107679 U | | 1/2012 |
| CN | 104841237 A | | 8/2015 |
| CN | 105080323 | * | 11/2015 |
| CN | 105080323 A | | 11/2015 |
| CN | 106823754 A | | 6/2017 |
| CN | 107344063 A | | 11/2017 |
| CN | 107352668 A | | 11/2017 |
| JP | 2016059836 A | | 4/2016 |

* cited by examiner

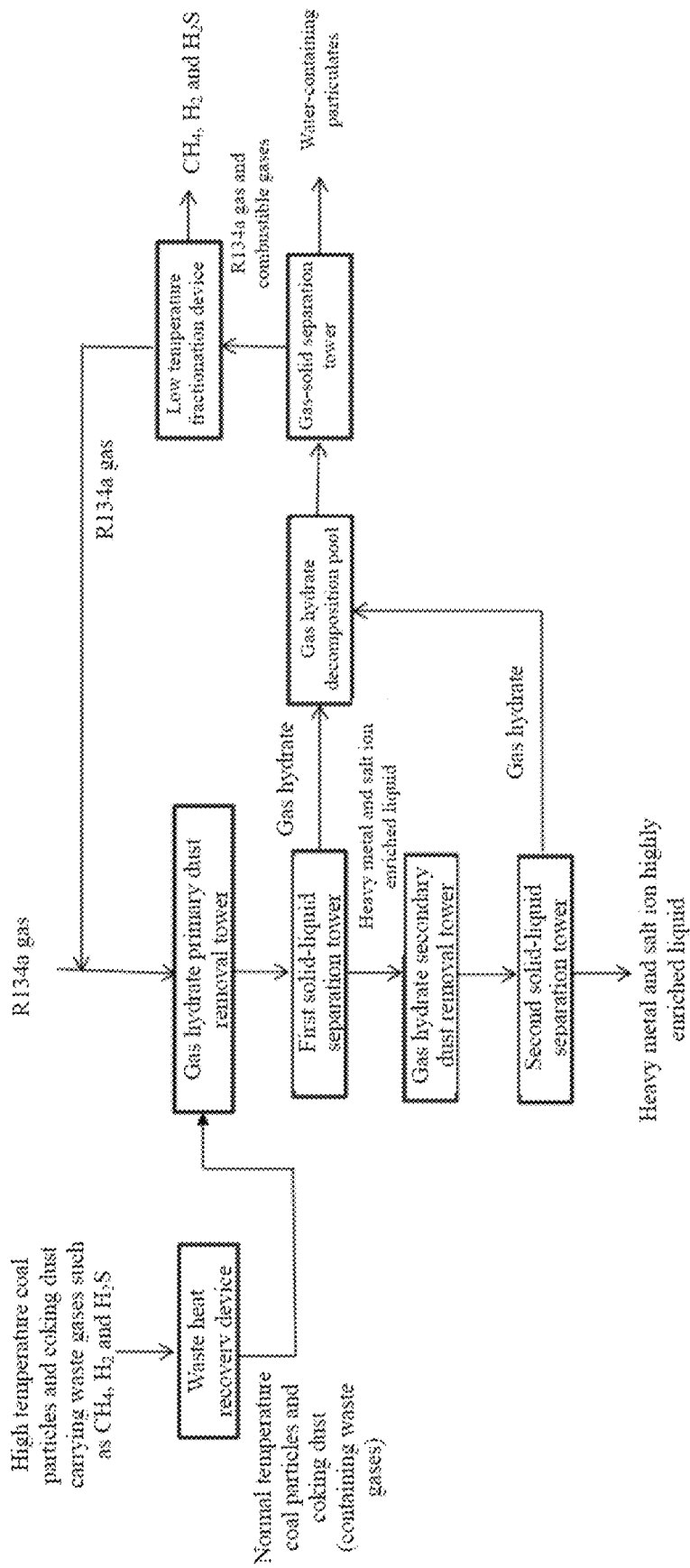

GAS HYDRATE-BASED PARTICULATE/WASTE GAS SIMULTANEOUS REMOVAL SYSTEM AND METHOD

TECHNICAL FIELD

The present invention belongs to the field of atmospheric particulate control, and particularly relates to a gas hydrate-based particulate/waste gas simultaneous removal system and method.

BACKGROUND

Iron and steel production is one of the main sources of emission of particulates and polluting waste gases in various industrial production activities in China. According to the *Data of China Statistical Yearbook on Environment*, in 2014, the annual emission of particulates from the iron and steel industry in China reaches $9.4 \times 10^9$ tons, and the emission of waste gases such as sulfur dioxide and nitrogen oxides reaches $3.1 \times 10^9$ tons. Coking production, as one of the largest sources of atmospheric pollution in the iron and steel industry, not only produces a lot of nano particulates, but also produces a lot of volatile constituents such as raw gas. Coke is the main product of coking, and a lot of atmospheric pollutants such as hydrocarbon, sulfide, cyanide, ammonia and dust are often emitted during coking. Therefore, the control on particulates and exhaust gases in iron and steel enterprises can effectively solve the air quality problem of the overall atmospheric space. However, at present, the particulate control and the waste gas treatment in the coking production process are carried out separately, and the device is complex and covers a large area. The gas hydrate method can realize the simultaneous treatment of particulates and waste gases, and recover high value-added gases while controlling particulates. The process is greatly simplified and meets the current air quality requirements.

At present, the particulate control technology mainly controls sedimentation by increasing the particulate size according to the particulate coagulation principle, mainly including: acoustic coagulation, electrical coagulation, magnetic coagulation, heat coagulation, mechanical coagulation and chemical coagulation, among which the most commonly used are electrical coagulation and chemical coagulation. The electrical coagulation method mainly includes: coulomb coagulation of heteropolarity charged dust, homogeneous charge coagulation in alternating electric field and charges of different polarity coagulation in alternating electric field. The coulomb coagulation of heteropolarity charged dust is used to remove particulates below 0.5 um, and the removal efficiency can reach 80%; the homogeneous charge coagulation in alternating electric field is mainly used to remove flying ash of 0.06-12 um, and the removal efficiency is increased to 98%; and the removal efficiency of the charges of different polarity coagulation in alternating electric field for particulates of 1 um approaches 100%, and the removal efficiency for particulates below 0.03 um is less than 10%. The effect of the above methods for capturing particulates is greatly limited by the particulate size. In the actual production process, the size distribution range of particulates/coking waste gases produced by coking plants is very wide. The efficiency of coagulation of the current particulate coagulation technology for micron particulates is very high and can reach 99.99%. However, the efficiency of coagulation is positively related to the particulate size, and especially, the collection efficiency for particulates below 10 nm is less than 40%. At this time, the above methods cannot effectively capture particulates/coking waste gases for removal. The efficiency of coagulation of the gas hydrate method is negatively related to the particulate size. Therefore, the patent proposes a gas hydrate method-based particulate/coking waste gas simultaneous removal method suitable for the coking production link of iron and steel plants, which synthesizes particulates/coking waste gases from iron and steel coking plants into gas hydrate and then conducts removal and separation.

The gas hydrate is a non-stoichiometry clathrate crystal formed by host water molecules forming a clathrate skeleton and small micromolecular light hydrocarbons such as $CH_4$, $H_2$, $H_2S$ and R134a entering the gas hydrate cage as guest molecules. 1 mol of gas hydrate can contain 180 mol of gas, so the gas hydrate has the advantage of high energy density as an energy storage medium. The gas hydrate will be preferentially generated in places with a large specific surface area, and particulates will be ideal attachment points for the gas hydrate due to the huge specific surface area and greatly shorten the generation time of the gas hydrate. Therefore, the present application uses the characteristic that the exhaust gases produced by iron and steel coking contain both particulates and exhaust gases, uses R134a which is an environmentally friendly non-toxic refrigerant without greenhouse effect to assist the formation of the gas hydrate on the surface of particulates, fixes the high value-added constituents such as $CH_4$, $H_2$ and $H_2S$ in the exhausted waste flue gas, and has the effect of simultaneous removal of particulates and harmful waste gases. Therefore, the present invention can achieve the removal of harmful substances such as heavy metals and coking waste gases while removing particulates. Compared with the current particulate control and waste gas treatment device, the gas hydrate method-based device is greatly simplified and can effectively reduce investment in the treatment site and economic cost.

SUMMARY

In view of the defects of the prior art, the present invention provides a gas hydrate-based particulate/waste gas simultaneous removal system and method. R134a gas is non-flammable, non-explosive, non-toxic, non-irritating and non-corrosive, has no effect on the ozone layer, and is the mainstream of the current environmentally friendly refrigerant; and R134a gas is not found to have chemical reaction with steel, iron, copper, aluminum and other metals. Therefore, the requirements for gas hydrate generation containers are greatly reduced, and the one-time investment in devices of plants is greatly reduced. The pure R134a gas hydrate can be formed at 2 atm and 13° C. However, if a mixed gas hydrate is generated with $CH_4$, $CO_2$ and $H_2S$ in the coking waste gases, the generation pressure will be greatly reduced, and even lower than 1 atm, which makes the energy consumption of the gas hydrate method for collecting particulates lower.

Therefore, R134a is used to synthesize particulates/coking waste gases into gas hydrate, which can realize the simultaneous removal of particulates/coking waste gases with no pollution and low energy consumption. The method has no selectivity on the size of particulates/coking waste gases, and has outstanding performance especially for particulates/coking waste gases with a size of less than 10 nm; the R134a gas used to assist the generation of the gas hydrate does not change the chemical properties and spatial structure after decomposition, and can be recycled to realize resourceful treatment; and meanwhile, high value-added gas and highly toxic gas H₂S obtained by dust removal can be directly recovered, and can be purified with the methods such as low temperature fractionation, which not only reduces the emission of harmful gases, but also realizes the resourceful treatment of high value-added gases.

The present invention proposes a gas hydrate-based particulate/waste gas simultaneous removal system, comprising a waste heat recovery device, a gas hydrate primary dust removal tower, a solid-liquid separation primary tower, a gas hydrate secondary dust removal tower, a solid-liquid separation secondary tower, a gas hydrate decomposition pool, a gas-solid separation tower and a low temperature fractionation device;

The waste heat recovery device is used to absorb high temperature coal particles and coking dust carrying raw gas generated in the production process, and to conduct cooling treatment to lower the temperature to room temperature so as to obtain ambient temperature coal particles and coking dust containing raw gas;

The gas hydrate primary dust removal tower is used for gas hydrate generation and particulate coagulation; the ambient temperature coal particles and coking dust carrying raw gas are passed into a pool for humidification, and at the same time, the R134a gas is introduced. At 1-2 atm and 2-13° C., the waste gases that can produce gas hydrate in the raw gas will preferentially generate gas hydrate on the surface of coal particles and coking dust so as to form clathrates with a larger size, and the particulates are sedimented by increasing the overall size; and part of the soluble heavy metal ions and inorganic salt ions adsorbed on the surface of coal particles and coking dust are dissolved in water;

The solid-liquid separation primary tower is used to separate the solid-liquid mixture in the gas hydrate primary dust removal tower, and the heavy metal and salt ion enriched liquid containing macromolecular gas hydrate slurry obtained from the gas hydrate primary dust removal tower is subjected to solid-liquid separation by means of membrane separation; and the heavy metal and salt ion enriched liquid obtained by separation enters the gas hydrate secondary dust removal tower for humidification, and the solid gas hydrate obtained by separation enters the gas hydrate decomposition pool;

The gas hydrate secondary dust removal tower is used for secondary removal of the gas hydrate generated by the gas and the water-containing coal particle and coking dust particulates that do not completely generate gas hydrate in the gas hydrate primary dust removal tower and the R134a gas at 1-2 atm and 2-13° C. to further remove coking waste gases and particulates, and to convey the formed heavy metal and salt ion highly enriched liquid containing gas hydrate slurry to the solid-liquid separation secondary tower;

The solid-liquid separation secondary tower is used to separate the solid-liquid mixture containing gas hydrate slurry obtained from the gas hydrate secondary dust removal tower, the solid gas hydrate obtained by separation enters the gas hydrate decomposition pool, and the heavy metal and salt ion highly enriched liquid obtained by separation is collected; and environmental pollution is prevented, and heavy metals can be obtained by further separation for reuse. The coal particle and coking dust particulates carrying waste gases generated at this time are conveyed to the gas hydrate decomposition pool in the form of macromolecular gas hydrate slurry;

The gas hydrate decomposition pool is used to decompose gas hydrate; and the gas hydrate solids obtained by separation from the first solid-liquid separation tower and the second solid-liquid separation tower are decomposed by means of pressure reduction or heating, and the gases and particulates obtained by decomposition are conveyed to the gas-solid separation tower;

The gas-solid separation tower is used for gas-solid separation of the waste gases obtained from the gas hydrate decomposition pool and the R134a gas and particulates, the gases are separated from the particulates in combination with membrane separation, and the obtained water-containing coal particle and coking dust particulates are collected for centralized treatment; and the obtained waste gases and the R134a gas are conveyed to the low temperature fractionation device for separation and recovery;

The low temperature fractionation device is used to separate the waste gases obtained from the gas-solid separation tower from the R134a; when the temperature drops to below the boiling point of R134a, R134a is liquefied, and the other gases are still kept in the gas phase state; the waste gases are subjected to centralized collection to be directly recovered and used as chemical materials so as to prevent exhaust into the atmosphere to pollute the environment; and the separated R134a is recovered and refiled into the gas hydrate primary dust removal tower for reuse to realize the resourceful treatment of materials.

The above method for a gas hydrate-based particulate/waste gas simultaneous removal system comprises the following steps:

Step 1: conveying high temperature coal particles and coking dust carrying raw gas generated in the production process to the waste heat recovery device, and conducting cooling treatment to lower the temperature to room temperature so as to obtain ambient temperature coal particles and coking dust containing raw gas;

Step 2: conveying the ambient temperature coal particles and coking dust containing raw gas to the gas hydrate primary dust removal tower, humidifying the ambient temperature coal particles and coking dust containing raw gas in the pool in the tower, introducing the R134a gas, and generating mixed gas hydrate on the surface of the particulates with the water-containing coal particle and coking dust particulates as attachment points, the water on the particulates as host molecules, and the waste gases and the R134a gas that can generate gas hydrate as guest molecules at 1-2 atm and 2-13° C.;

Step 3: conveying the macromolecular gas hydrate particulates obtained from the gas hydrate primary dust removal tower, and the enriched liquid containing heavy metals and salt ions to the first solid-liquid separation tower for solid-liquid separation, conveying the obtained gas hydrate particulates to the gas hydrate decomposition pool, and conveying the obtained enriched liquid containing heavy metals and salt ions to the gas hydrate secondary dust removal tower;

Step 4: in the gas hydrate secondary dust removal tower, carrying out secondary gas hydrate synthesis on the enriched liquid containing heavy metals and salt ions, and mainly further mixing the water-containing coal particle and coking dust particulates that are not completely synthesized into gas hydrate in the gas hydrate primary dust removal tower to generate gas hydrate so as to further remove the particulates and waste gases;

Step 5: separating the heavy metal and salt ion enriched liquid and the gas hydrate particulates obtained from the gas hydrate secondary dust removal tower in the solid-liquid separation secondary tower, conveying the obtained gas hydrate particulate solids to the gas hydrate decomposition pool, and collecting the obtained heavy metal and salt ion highly enriched liquid;

Step 6: decomposing the gas hydrate solids obtained from the solid-liquid separation primary tower and the solid-liquid separation secondary tower by means of pressure reduction or heating in the gas hydrate decomposition pool to obtain waste gases and R134a gas as well as water-containing coal particle and coking dust particulates providing attachment points for the formation of gas hydrate, and conveying the gases and particulates obtained by decomposition to the gas-solid separation tower;

Step 7: carrying out gas-solid separation on the waste gases and R134a gas and the water-containing coal particle and coking dust particulates providing attachment points for the formation of gas hydrate in the gas-solid separation tower, and collecting the obtained water-containing coal particle and coking dust particulates to prevent environmental pollution; and conveying the obtained waste gases and R134a gas to the low temperature fractionation device;

Step 8: fractionating the waste gases and the R134a in the gas low temperature fractionation device according to the boiling point of each gas, lowering the temperature to below the boiling point of R134a for liquefaction, and collecting the separated waste gases by the gas-liquid separation device; and separately collecting the separated R134a liquid;

Step 9: refilling the R134a separated in the low temperature fractionation device into the gas hydrate primary dust removal tower to realize recycling.

Further preferably, the gas hydrate generation conditions in step 2 or step 4 are 1-1.5 atm and 10-13° C. In order to form the mixed gas hydrate, energy consumption is greatly reduced.

Further, the waste gases that can produce gas hydrate in step 2 comprise one or more of $CH_4$, $H_2$ and $H_2S$.

The present invention has the beneficial effects that: the present invention proposes a gas hydrate-based particulate/coking waste gas simultaneous removal system and method for iron and steel coking plants, which form large-diameter hydrate clathrates in the working condition of low temperature with the water-containing coal particles and coking dust as attachment points and the R134a gas and the waste gases such as $CH_4$, $H_2$ and $H_2S$ as guest molecules. The method has no selectivity on the size of particulates/coking waste gases, has outstanding performance especially for particulates/coking waste gases with a size of less than 10 nm, and can remove particulates by increasing the diameter of the nano particulates. The process flow is greatly simplified, and the equipment investment, energy investment and site investment in the exhaust gas treatment process are greatly reduced. The R134a gas used to synthesizing gas hydrate can be recycled to realize resourceful treatment; and meanwhile, the combustible gases obtained by dust removal can be directly recovered, which further reduces the emission of harmful gases and the environmental pollution and increases the energy utilization rate.

DESCRIPTION OF DRAWING

The sole FIGURE is a flow chart of a gas hydrate-based particulate/coking waste gas simultaneous removal method for iron and steel coking plants of the present invention.

DETAILED DESCRIPTION

Embodiment 1

The embodiment is a gas hydrate-based particulate/coking waste gas simultaneous removal method for iron and steel coking plants, and the process is as follows in combination with the sole FIGURE:

Step 1: conveying high temperature coal particles and coking dust carrying waste gases such as $CH_4$, $H_2$ and $H_2S$ generated in the production process of iron and steel coking plants to the waste heat recovery device, and conducting cooling treatment to obtain ambient temperature coal particles and coking dust containing waste gases such as $CH_4$, $H2$ and $H_2S$;

Step 2: conveying the ambient temperature coal particles and coking dust containing waste gases such as $CH_4$, $H_2$ and $H_2S$ to the gas hydrate primary dust removal tower, humidifying the ambient temperature coal particles and coking dust containing waste gases such as $CH_4$, $H_2$ and $H_2S$ in the pool in the tower to obtain water-containing particulates, introducing the R134a gas to the gas hydrate primary dust removal tower, and forming large-size gas hydrate particulates in the tower at 1.5 atm and 10° C. to obtain the heavy metal and salt ion enriched liquid containing gas hydrate slurry;

Step 3: conveying the heavy metal and salt ion enriched liquid containing gas hydrate slurry to the solid-liquid separation primary tower for solid-liquid separation, conveying the obtained gas hydrate particulates to the gas hydrate decomposition pool, and conveying the obtained enriched liquid containing heavy metals and salt ions to the gas hydrate secondary dust removal tower;

Step 4: in the gas hydrate secondary dust removal tower, further removing the gas hydrate generated by the water-containing coal particle and coking dust particulates that are not completely synthesized into gas hydrate in the gas hydrate primary dust removal tower, wherein the gas hydrate generation conditions are the same as those in step 2, and obtaining the heavy metal and salt ion highly enriched liquid containing gas hydrate slurry;

Step 5: separating the heavy metal and salt ion highly enriched liquid containing gas hydrate slurry obtained from the gas hydrate secondary dust removal tower in the solid-liquid separation secondary tower, conveying the obtained gas hydrate particulate solids to the gas hydrate decomposition pool, and collecting the obtained heavy metal and salt ion highly enriched liquid;

Step 6: decomposing the gas hydrate solids from the solid-liquid separation primary tower and the solid-liquid separation secondary tower by means of pressure reduction in the gas hydrate decomposition pool to obtain waste gases such as $CH_4$, $H_2$ and $H_2S$ and R134a gas as well as water-containing coal particle and coking dust particulates providing attachment points for the formation of gas hydrate, and conveying the gases and particulates obtained by decomposition to the gas-solid separation tower;

Step 7: carrying out gas-solid separation on the waste gases such as $CH_4$, $H_2$ and $H_2S$ and the R134a gas and the coal particle and coking dust particulates in the gas-solid separation tower, and collecting the obtained coal particle and coking dust particulates to prevent environmental pollution; and conveying the obtained waste gases such as $CH_4$, $H_2$ and $H_2S$ and the R134a gas to the low temperature fractionation device;

Step 8: fractionating the waste gases such as $CH_4$, $H_2$ and $H_2S$ and the R134a in the gas low temperature fractionation device according to the boiling point of each gas, wherein the boiling point of $H_2$ is −252.77° C., the boiling point of $CH_4$ is −161.5° C., the boiling point of $H_2S$ is −60.4° C., and the boiling point of R134a is −26.4° C., and lowering the temperature to −30° C. to liquefy R134a, wherein the separated waste gases such as $CH_4$, $H_2$ and $H_2S$ can be directly recovered as energy products or chemical materials to reduce atmospheric pollution; and refilling the separated R134a liquid into the gas hydrate primary dust removal tower/pool to realize recycling.

Although the patent technology is described above in combination with the accompanying drawings, the patent technology is not limited to the above embodiment and the above experimental gases. The above usage mode is only for description but not for limitation. Deformations made without departing from the present invention under the enlightenment of the present invention shall belong to the protection of the present invention.

The invention claimed is:

1. A gas hydrate-based particulate/waste gas simultaneous removal system, wherein the system comprises a waste heat recovery device, a gas hydrate primary dust removal tower, a solid-liquid separation primary tower, a gas hydrate secondary dust removal tower, a solid-liquid separation secondary tower, a gas hydrate decomposition pool, a gas-solid separation tower and a low temperature fractionation device;

the waste heat recovery device is used to absorb high temperature coal particles and coking dust carrying raw gas generated in a production process, and to conduct cooling treatment to lower the temperature to room temperature so as to obtain ambient temperature coal particles and coking dust containing raw gas;

the gas hydrate primary dust removal tower is used for gas hydrate generation and particulate coagulation; the ambient temperature coal particles and coking dust carrying raw gas are passed into a pool for humidification, and at the same time, R134a gas is introduced at 1-2 atm and 2-13° C., the waste gases that can produce gas hydrate in the raw gas will preferentially generate gas hydrate on the surface of coal particles and coking dust so as to form clathrates with a larger size, and the particulates are sedimented by increasing the overall size; and part of the soluble heavy metal ions and inorganic salt ions adsorbed on the surface of coal particles and coking dust are dissolved in water;

the solid-liquid separation primary tower is used to separate the solid-liquid mixture in the gas hydrate primary dust removal tower, and the heavy metal and salt ion enriched liquid containing macromolecular gas hydrate slurry obtained from the gas hydrate primary dust removal tower is subjected to solid-liquid separation by the solid-liquid separation primary tower; and the heavy metal and salt ion enriched liquid obtained by separation enters the gas hydrate secondary dust removal tower for humidification, and the solid gas hydrate obtained by separation enters the gas hydrate decomposition pool;

the gas hydrate secondary dust removal tower is used for secondary removal of the gas hydrate generated by the gas and the water-containing coal particle and coking dust particulates that do not completely generate gas hydrate in the gas hydrate primary dust removal tower and the R134a gas at 1-2 atm and 2-13° C. to further remove coking waste gases and particulates, and to convey the formed heavy metal and salt ion highly enriched liquid containing gas hydrate slurry to the solid-liquid separation secondary tower;

the solid-liquid separation secondary tower is used to separate the solid-liquid mixture containing gas hydrate slurry obtained from the gas hydrate secondary dust removal tower, the solid gas hydrate obtained by separation enters the gas hydrate decomposition pool, and the heavy metal and salt ion highly enriched liquid obtained by separation is collected; and the coal particle and coking dust particulates carrying waste gases generated at this time are conveyed to the gas hydrate decomposition pool in the form of macromolecular gas hydrate slurry;

the gas hydrate decomposition pool is used to decompose gas hydrate; and the gas hydrate solids obtained by separation from the first solid-liquid separation tower and the second solid-liquid separation tower are decomposed by the gas hydrate decomposition pool, and the gases and particulates obtained by decomposition are conveyed to the gas-solid separation tower;

the gas-solid separation tower is used for gas-solid separation of the waste gases obtained from the gas hydrate decomposition pool and the R134a gas and particulates, the gases are separated from the particulates in combination with membrane separation, and the obtained water-containing coal particle and coking dust particulates are collected for centralized treatment; and the obtained waste gases and the R134a gas are conveyed to the low temperature fractionation device for separation and recovery;

the low temperature fractionation device is used to separate the waste gases obtained from the gas-solid separation tower from the R134a; when the temperature drops to below the boiling point of R134a, R134a is liquefied, and the other gases are still kept in the gas phase state; the waste gases are subjected to centralized collection to be directly recovered and used as chemical materials so as to prevent exhaust into the atmosphere to pollute the environment; and the separated R134a is recovered and refiled into the gas hydrate primary dust removal tower for reuse to realize the resourceful treatment of materials.

2. A method for a gas hydrate-based particulate/waste gas simultaneous removal system using the system according to claim 1, wherein the method comprises the following steps:

step 1: conveying high temperature coal particles and coking dust carrying raw gas generated in the production process to the waste heat recovery system, and conducting cooling treatment to lower the temperature to room temperature so as to obtain ambient temperature coal particles and coking dust containing raw gas;

step 2: conveying the ambient temperature coal particles and coking dust containing raw gas to the gas hydrate primary dust removal tower, humidifying the ambient temperature coal particles and coking dust containing raw gas in the pool in the tower, introducing the R134a gas, and generating mixed gas hydrate on the surface of the particulates with the water-containing coal particle and coking dust particulates as attachment points, the water on the particulates as host molecules, and the waste gases and the R134a gas that can generate gas hydrate as guest molecules at 1-2 atm and 2-13° C.;

step 3: conveying the macromolecular gas hydrate particulates obtained from the gas hydrate primary dust removal tower, and the enriched liquid containing heavy metals and salt ions to the first solid-liquid separation tower for solid-liquid separation, conveying the obtained gas hydrate particulates to the gas hydrate decomposition pool, and conveying the obtained enriched liquid containing heavy metals and salt ions to the gas hydrate secondary dust removal tower;

step 4: in the gas hydrate secondary dust removal tower, carrying out secondary gas hydrate synthesis on the enriched liquid containing heavy metals and salt ions, and mainly further mixing the water-containing coal particle and coking dust particulates that are not completely synthesized into gas hydrate in the gas hydrate primary dust removal tower to generate gas hydrate so as to further remove the particulates and waste gases;

step 5: separating the heavy metal and salt ion enriched liquid and the gas hydrate particulates obtained from the gas hydrate secondary dust removal tower in the solid-liquid separation secondary tower, conveying the obtained gas hydrate particulate solids to the gas hydrate decomposition pool, and collecting the obtained heavy metal and salt ion highly enriched liquid;

step 6: decomposing the gas hydrate solids obtained from the solid-liquid separation primary tower and the solid-liquid separation secondary tower by the gas hydrate decomposition pool to obtain waste gases and R134a gas as well as water-containing coal particle and coking dust particulates providing attachment points for the formation of gas hydrate, and conveying the gases and particulates obtained by decomposition to the gas-solid separation tower;

step 7: carrying out gas-solid separation on the waste gases and R134a gas and the water-containing coal particle and coking dust particulates providing attachment points for the formation of gas hydrate in the gas-solid separation tower, and collecting the obtained water-containing coal particle and coking dust particulates to prevent environmental pollution; and conveying the obtained waste gases and R134a gas to the low temperature fractionation device;

step 8: fractionating the waste gases and the R134a in the gas low temperature fractionation device according to the boiling point of each gas, lowering the temperature to below the boiling point of R134a for liquefaction, and collecting the separated waste gases by the gas-liquid separation device; and separately collecting the separated R134a liquid;

step 9: refilling the R134a separated in the low temperature fractionation device into the gas hydrate primary dust removal tower to realize recycling.

3. The method for a gas hydrate-based particulate/waste gas simultaneous removal system according to claim 2, wherein the gas hydrate generation conditions in step 2 or step 4 are 1-1.5 atm and 10-13° C.

4. The method for a gas hydrate-based particulate/waste gas simultaneous removal system according to claim 2, wherein the waste gases that can produce gas hydrate in step 2 comprise one or more of $CH_4$, $H_2$ and $H_2S$.

\* \* \* \* \*